United States Patent
Lee et al.

(10) Patent No.: US 7,593,599 B2
(45) Date of Patent: Sep. 22, 2009

(54) METHOD OF ASSEMBLING A COMPOSITE DATA MAP HAVING A CLOSED-FORM SOLUTION

(75) Inventors: Simon Lee, Webster, NY (US); Donald Paul McClimans, Fairport, NY (US); Mark Joseph Tronolone, Fairport, NY (US)

(73) Assignee: Corning Incorporated, Corning, NY (US)

( * ) Notice: Subject to any disclaimer, the term of this patent is extended or adjusted under 35 U.S.C. 154(b) by 465 days.

(21) Appl. No.: 11/160,619

(22) Filed: Jun. 30, 2005

(65) Prior Publication Data

US 2007/0003163 A1 Jan. 4, 2007

(51) Int. Cl.
*G06K 9/36* (2006.01)

(52) U.S. Cl. .................. 382/284; 382/294
(58) Field of Classification Search .......... 382/284, 382/294
See application file for complete search history.

(56) References Cited

U.S. PATENT DOCUMENTS

| | | | |
|---|---|---|---|
| 5,416,586 A | | 5/1995 | Tronolone et al. |
| 5,528,290 A | * | 6/1996 | Saund ............... 348/218.1 |
| 5,581,637 A | * | 12/1996 | Cass et al. .............. 382/284 |
| 5,657,402 A | * | 8/1997 | Bender et al. ............ 382/284 |
| 5,987,189 A | * | 11/1999 | Schmucker et al. ........ 382/284 |
| 5,991,461 A | | 11/1999 | Schmucker et al. ........ 382/284 |
| 6,075,905 A | * | 6/2000 | Herman et al. ............ 382/284 |
| 6,694,064 B1 | * | 2/2004 | Benkelman .............. 382/284 |
| 6,956,657 B2 | | 10/2005 | Golini et al. |
| 7,068,833 B1 | * | 6/2006 | Ghinovker et al. ......... 382/144 |
| 7,123,779 B2 | * | 10/2006 | Beuker et al. ............. 382/294 |
| 2005/0063608 A1 | * | 3/2005 | Clarke et al. ............. 382/284 |
| 2005/0069188 A1 | | 3/2005 | Rubbert et al. |
| 2006/0257051 A1 | * | 11/2006 | Zavadsky et al. .......... 382/294 |

OTHER PUBLICATIONS

Otsubo et al.; "Measurement of large plane surface shapes by connecting small-aperture interferograms"; Optical Engineering; Feb. 1994; vol. 33, No. 2; pp. 608-613.
Michael Bray; "Stitching Interferometry: Recent results and absolute calibration"; MB Optique; SPIE 5252-43; 2003.
Michael Bray; "Stitching Interferometry for the wavefront metrology of x-ray mirrors"; MB Optique; SPIE 4501-07; 2001.
Lahsen Assoufid et al; "3-D Profile measurements of large x-ray synchrotron radiation mirrors using stitching interferometry"; MB Optique; SPIE 4782-03; 2002.
Michael Bray; "Stitching interferometer for large plano optics using a standard interferometer"; MB Optique; SPIE 3134; 1997.
Michael Bray; "Stitching Interferometer: Side effects and PSD"; MB Optique; SPIE 3782-59; 1999.
Michael Bray; "Stitching Interferometer and Absolute Surface Shape Metrology: Similarities"; MB Optique; SPIE 4451-40; 2001.

\* cited by examiner

*Primary Examiner*—Charles Kim
*Assistant Examiner*—Stephen R Koziol
(74) *Attorney, Agent, or Firm*—Timothy M. Schaeberle

(57) ABSTRACT

Local data maps of an optical imaging system are stitched together into a composite global data map based on a merit function supporting closed-form processing. Overlapping regions of the local data maps are defined as difference maps that are given a parametric description. Corrective orientations of the local data maps are derived by collectively matching parametric descriptions of the corrective orientations for the overlapping local data maps to the parametric descriptions of the corresponding difference maps.

33 Claims, 2 Drawing Sheets

(12) United States Patent
US 7,593,599 B2

METHOD OF ASSEMBLING A COMPOSITE DATA MAP HAVING A CLOSED-FORM SOLUTION

TECHNICAL FIELD

The invention relates to digital image processing, particularly for purposes of optical metrology, in which data sets from multiple images are combined to form a composite image. The combination of adjacent images allows smaller or more practically sized optics to be used for extending high-resolution imaging over larger fields of view.

BACKGROUND OF INVENTION

Test objects larger than the field of view of optical measuring instruments, such as interferometers, can be measured by combining individual optical measurements, referred to as "sub-aperture measurements", for constructing a composite optical measurement of the test object, presumably a "full-aperture measurement". The process of combining the individual optical measurements is referred to as "stitching". Data is typically collected from the individual measurements in the form of local data maps, which are "stitched" together to form a composite global data map. Two main approaches to "stitching" are used, both based on exploiting redundant data within regions of overlap between adjacent measurements.

One of the two main approaches to "stitching" starts with a first local data map and determines differences from an adjacent second local data map within a region of overlap between the two local data maps. The orientation of the second local data map is adjusted with respect to the first local data map to minimize differences within the overlap region. Any remaining differences within the overlap region are averaged to complete a junction between the two local data maps and create a combined map. The local data maps collected by additional measurements are similarly joined to the combined data map, one at a time, to produce a composite global data map. The sequential assembly of the composite global data map leads to cumulative errors, which propagate through assembly generations, and the results are dependent on the order at which the local data maps are stitched together.

The other of the two main approaches provides for collectively minimizing differences within all of the regions of overlap between the local data maps by iterating over ranges of possible individual local data map orientations. The progress of each iteration is checked against the resulting changes to the differences within the overlap regions. The iterative solution specifies orientations of each of the local data maps for assembling a composite global data map. Although good results are possible, processing time, particularly for large numbers of measurements, can exceed reasonable wait times for measuring parts in succession. Some iterative stitching solutions can require one hour or even several hours of processing.

SUMMARY OF INVENTION

Improved processing times for combining high resolution images can be achieved in accordance with the invention using closed-form solutions. In one or more of the preferred embodiments, differences between adjacent local images within regions of overlap are given parametric descriptions that provide a basis for a merit function to evaluate similar parametric descriptions of orientation or form variations among the local images. High-resolution data within the local images is maintained while collectively assembling the local images into a composite global image. The orientation variations calculated for assembling the composite global images collectively minimize residual errors within the regions of overlap measured according to the merit function as a departure from a null or other specified condition regarding the parametric descriptions of the overlap regions.

One version of the invention as a method of relating local data maps for forming a composite global data map starts by evaluating overlapping regions of local data maps to define a plurality of difference maps. A set of parameters is fit to the difference maps to quantify initial differences between the overlapping regions of the local data maps. A corresponding set of parameters is defined, which can be varied in value for altering orientations of the local data maps. A set of linear equations is solved to determine the parameter values of the local data maps that satisfy a merit function incorporating the parameter values of the difference maps.

The set of parameters fit to the difference maps can, for example, include coefficients of a difference surface. The set of parameter values that alter orientations of the local data maps can include similar surface coefficients. The solution of the related linear equations determines the surface coefficients of the local maps required to compensate for the surface coefficients fit to the difference maps. The differences between surface coefficients of the overlapping local data maps can be collectively estimated by way of a linear regression against the surface coefficients of the corresponding difference maps. Most advantageously for minimizing processing time, the surface coefficients of the local data maps are estimated from a closed set of linear equations.

Examples of the parameters for fitting the difference maps include piston and tilt terms of difference surfaces. Corresponding piston and tilt terms can be used for estimating the orientations of the local data maps as surfaces of orientation. Differences between the individual terms of the overlapping local data maps can be matched to the individual terms of the corresponding difference maps, and any residual errors can be collectively distributed among the matches. For example, a least squares regression analysis can be used for minimizing the residual errors. The matches can also be weighted for unevenly distributing the residual errors among the matches based on characteristics of the overlapping regions. One preferred approach weights the matches according to sizes of the overlapping regions. Alternatively, the local data maps can overlap each other through similarly sized and shaped regions of overlap to equalize or eliminate the weighting.

The manipulation of parameters, such as piston and tilt, is based on an assumption that the local data sets themselves are subject to such errors. Accordingly, the alteration of the local data sets to reflect different values of these parameters for the purpose of stitching does not involve a significant loss of information. Higher order terms such as power, a measure of curvature, can also be used for matching issues of form, where the local data sets themselves are subject to such errors.

Another version of the invention as a method of stitching together overlapping measurements of a test object starts with acquiring overlapping images of different portions of the test object as a plurality of local data maps encoding imaging information about the test object. Differences are described between overlapping regions of the local data maps as oriented difference surfaces. Relationships are established among the local data maps as oriented local surfaces. Descriptions of the oriented local surfaces are determined based on collectively matching differences between the oriented local surfaces of overlapping local data maps and the oriented difference surfaces of the corresponding overlapping regions. The local data maps are combined into a composite data map based on the descriptions of the oriented local surfaces.

Preferably, the differences between overlapping regions are described as coefficients of the difference surfaces. The relationships established among the local data maps preferably include a definition of terms for describing relative orientations among the local data maps. The descriptions of the oriented local surfaces preferably include coefficients of the local surfaces that correspond to the coefficients of the difference surfaces. The local data maps can be combined by altering the local data maps according to the descriptions of corresponding local surfaces.

Linear equations in a closed form are preferably solved to collectively determine one or more descriptions of the oriented local surfaces. The differences between the oriented local surfaces of overlapping local data maps and the oriented difference surfaces can be associated with residual errors that are collectively minimized according to a regression algorithm. The residual errors can be weighted to accommodate different overlapping regions.

DETAILED DESCRIPTION

The invention is preferably practiced with a digital image processing system having a field of view that is limited with respect to the intended field to be imaged. Digital images are taken from different relative positions so that the images collectively cover the intended field.

Figure 1:
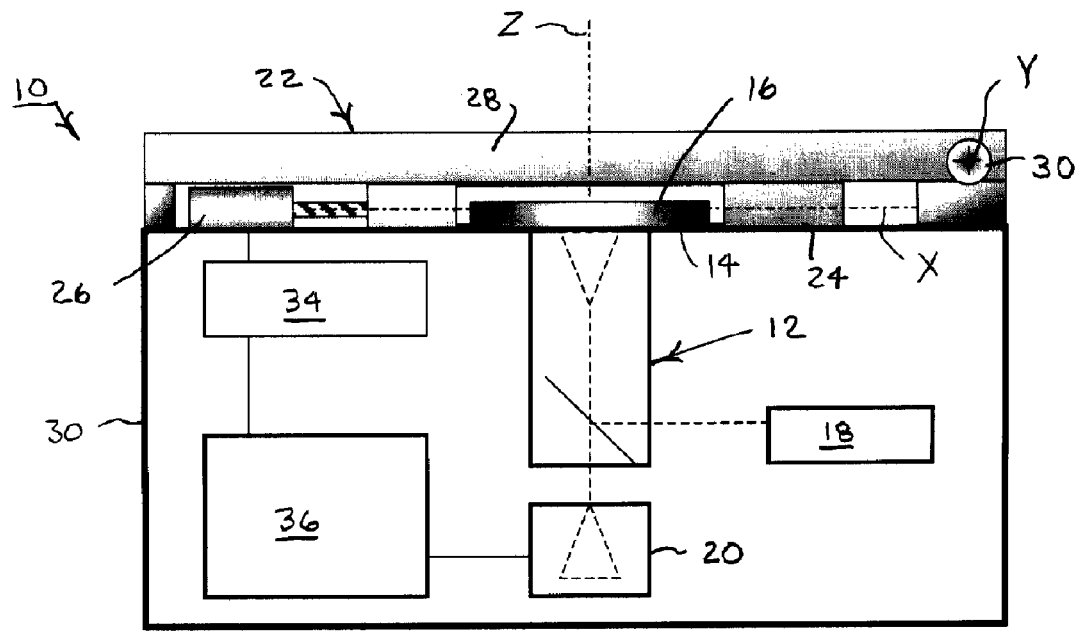
FIG. 1 is a schematic depiction of an optical measuring system in which a test object is mounted on a translatable stage beneath an imaging device for moving a test surface of the test object across a field of view of the imaging device.

FIG. 1, by way of example, depicts a digital image processing system 10, incorporating digital imaging device 12 in the form of an interferometric measuring instrument, for measuring surface features of a test surface 14 on a test object 16. Such interferometers can be arranged to operate at normal or grazing incidence over the limited field of view using coherent or non-coherent light. In the embodiment shown, the light source is a laser 18, which illuminates a portion of the test surface 14 for gathering topographical information. A digital camera 20 having a limited field of view with respect to the test surface 14 captures interferometric images of portions of the test surface 14 as local data maps containing topographical information.

The test object 16 is mounted on a motion stage 22 that controls relative motion of the test object 16 with respect to the digital imaging device (interferometer) 12 for measuring different portions of the test surface 14. The motion stage 22 has two orthogonal linear axes of motion; one along an "X" coordinate axis and one along a "Y" coordinate axis. A first translation stage 24 moves the test object 16 along the X coordinate axis under the control of a first drive 26, which is instrumented to provide position feedback information for measuring motion of the stage 24 along the X coordinate axis. A second translation stage 28 moves the test object 16 along the Y coordinate axis under the control of a second drive 30, which is instrumented to provide position feedback information for measuring motion of the stage 28 along the Y coordinate axis. The two translation stages 24 and 28 are stacked together on a common base 30 that also supports the digital imaging device 12 within a common enclosure.

A controller 34, under the instruction of a computer processor 36, controls operation of the motion stage 22 providing desired translations of the test object 16 through a succession of positions along the two coordinate axes X and Y. The associated instrumentation of the coordinate axes X and Y provides position feedback information that can be used for better controlling the movements of the translation stages 24 and 28 through successive positions at which images recorded as the local data maps overlie the entire area of the test surface 14 intended for measurement. The X-Y coordinate information also serves to locate the individual measurements of the test surface 14 with respect to each other.

Although the motion stage 22 is shown with two rectilinear axes for translating the test surfaces 14 through the field of view captured by the digital camera 20, other relative motions can also be used for capturing successive images of different portions of the test surface 14. For example, one or more rotational motions can be used alone or in combination with translational motions to stepwise capture different portions of the test surface 14. Motion can be imparted to the test part 14, to the digital imaging device 12, or to both the test part 14 and the digital imaging device 12 to effect the desired relative motion.

Figure 2:
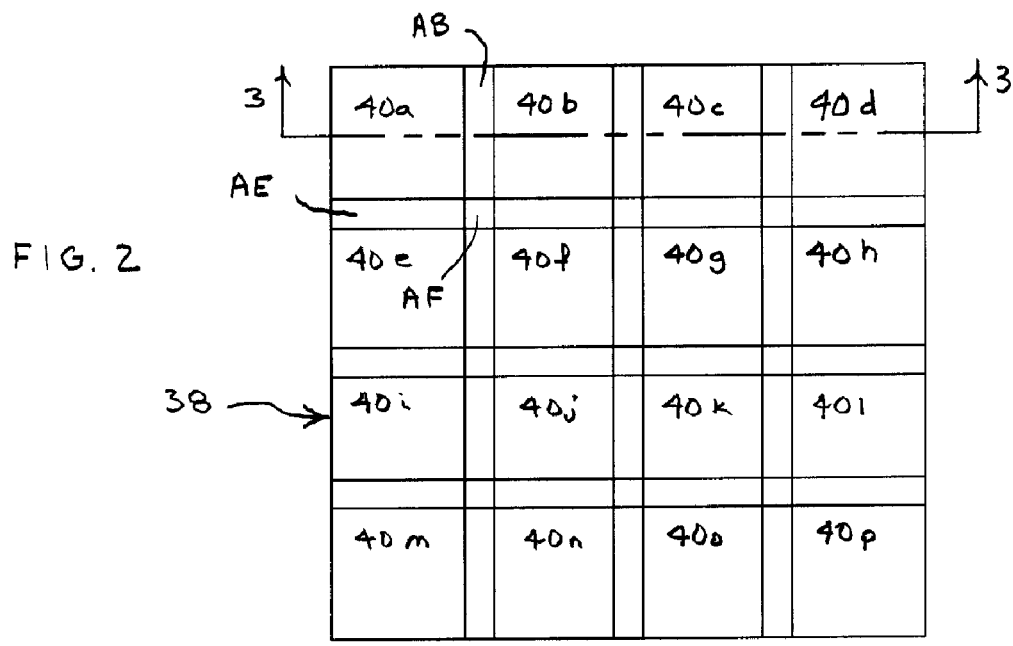
FIG. 2 is a plan view of a pattern of local data maps captured by the imaging device at different locations across the test surface, which overlap at their edges to provide information for assembling a composite global map of the test surface.

An array of overlapping local data maps 40a through 40p is depicted in FIG. 2 as an example of pattern of the views that can be captured by the digital camera 20 for covering the desired area of the test surface 14. Each of the local data maps overlaps with at least three other local data maps. For example, the local data map 40a overlaps with the local data map 40b within an overlap region AB, overlaps with the local data map 40e within the overlap region AE, and overlaps with the local data map 40f within the smaller overlap region AF.

The digital image processing system 10 is presumed to accurately locate each of the local data maps 40a-40p along the X and Y coordinate axes of the motion stage 22 for which feedback is available. However, the local data maps 40a-40p are subject to some translational variation along an orthogonally related "Z" coordinate axis, referred to as "piston", as well as some angular variation with respect to the Z axis as referenced in the X-Z and Y-Z planes, referred to as "tilt".

Figure 3:
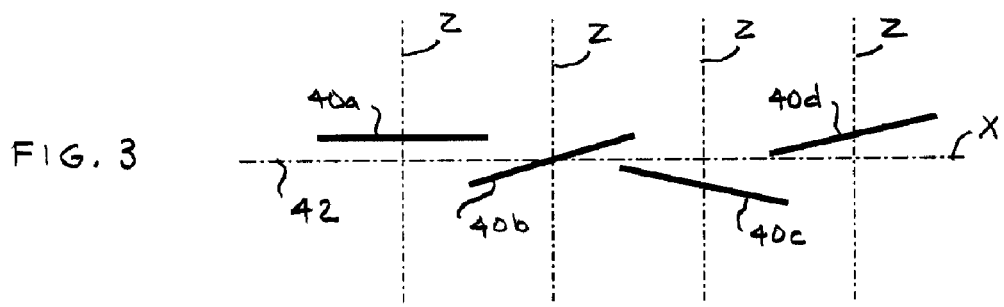
FIG. 3 is an edge view of an image plane of the imaging device taken as a cross section through one row of the local data maps showing the local data maps variously offset and inclined to the image plane.

FIG. 3 depicts exaggerated piston and tilt variations among the local data maps 40a-40d as seen in the X-Z plane. The local data map 40a has a positive piston variation displaced slightly above a theoretical image plane 42 coincident with an X-Y plane. The local data map 40b has a tilt variation inclined positively with respect to the Z-axis. The local data map 40c has a negative piston variation and a negative tilt variation. The local data map 40d has a positive piston variation and a positive tilt variation.

Generally, for purposes of "stitching", i.e., combining the local data maps together to form a composite global data map, the image plane 42 is not available as an absolute reference. However, the regions of overlap can be defined as difference surfaces that quantify the differences between the overlapping portions of the local data maps. The invention also provides in its preferred form for parametric descriptions of the difference surfaces in terms of such variables as piston and tilt through which the local data maps are subject to variation.

For purposes of calculation, a set of K total local data maps $m_1, m_2, \ldots m_K$ corresponding, for example, to the local data maps 40a-40p are collected, overlapping each other through N overlapped regions designated as $p_1, p_2, \ldots p_N$. A set of N total difference maps $d_1, d_2, \ldots d_N$ are calculated from the differences between the overlapping data maps, e.g., $m_2\text{-}m_1$, within the overlapped regions, e.g., p1. Ignoring noise, the difference maps $d_1, d_2, \ldots d_N$ should represent oriented planes, which can be described by a set of piston terms $dp_1, dp_2, \ldots dp_N$, representing displacement of the planes along the Z axis, a set of X-tilt terms $dx_1, dx_2, \ldots dx_N$, representing tilt of the planes in the X-Z plane, and a set of Y-tilt terms $dy_1, dy_2, \ldots dy_N$, representing tilt of the planes in the Y-Z plane. Conventional first-order fitting techniques can be used to derive the piston $dp_1, dp_2, \ldots dp_N$ term, the X-tilt term $dx_1, dx_2, \ldots dx_N$, and the Y-tilt term $dy_1, dy_2, \ldots dy_N$ from the difference maps $d_1, d_2, \ldots d_N$.

A preferred approach to stitching the local data maps $m_1, m_2, \ldots m_K$ together involves determining the corresponding piston and tilt terms through which the local data maps can be relatively oriented so that the piston and tilt terms $dp_1, dp_2, \ldots dp_N, dx_1, dx_2, \ldots dx_N$, and $dy_1, dy_2, \ldots dy_N$ of the remaining difference maps $d_1, d_2, \ldots d_N$ are as small as possible. For example, considering a difference map $d_1$ constructed from the difference between local data maps $m_2$ and $m_1$ within the overlapped region $p_1$, the X-tilt term $dx_1$ of the difference map $d_1$ can be minimized by relatively inclining the local data maps $m_1$ and $m_2$ by a corresponding amount. Referencing, for example, the X-tilt values superimposed upon the local data maps as $mx_1, mx_2, \ldots mx_K$, the difference between the superimposed X-tilt values of overlapping local data maps, e.g., mx2-mx1, should match the value of the X-tilt term, e.g., $dx_1$, of the difference map, e.g., $d_1$. Thus, the X-tilt terms $dx_1, dx_2, \ldots dx_N$ that are fit to the difference maps $d_1, d_2, \ldots d_N$ provide merit values against which corresponding changes $mx_1, mx_2, \ldots mx_K$ to the local data maps $m_1, m_2, \ldots m_K$ can be collectively assessed. Similarly, the piston terms $dp_1, dp_2, \ldots dp_N$ and the Y terms $dy_1, dy_2, \ldots dy_N$ also provide merit values against which corresponding piston changes $mp_1, mp_2, \ldots mp_K$ and corresponding Y-tilt changes $my_1, my_2, \ldots my_K$ to the local data maps $m_1, m_2, \ldots m_K$ can be collectively assessed.

For example, a least squares regression can be constructed as follows:

$$T = \sum_{n=1}^{N} (tx_n - mx_i + mx_j)^2$$

where $mx_i$ and $mx_j$ are the X-tilt values for the overlapping local data maps corresponding to the difference map described by the X-tilt value $dx_n$ and T is the sum of the remaining X tilts of the difference maps $d_1, d_2, \ldots d_N$ after having adjusted the local data maps $m_1, m_2, \ldots m_K$ by the X-tilt changes $mx_1, mx_2, \ldots mx_K$. The sum T is minimized to determine optimized orientations of the local data maps with respect to each other for combining the local data maps into a composite global data map.

Each of the terms can be differently weighted by a coefficient $W_N$ to relatively adjust the significance of the individual difference maps $d_1, d_2, \ldots d_N$ according to one or more criteria as follows:

$$T = \sum_{n=1}^{N} W_n(tx_n - mx_i + mx_j)^2$$

For example, the terms can be weighted according to the amount of area occupied by the difference maps, by the locations of the difference maps, or by the number of difference maps associated with each of the local data maps $m_1, m_2, \ldots m_K$. The weighting coefficient could also be based on a measure of the reliability of the data or the uncertainty of the data. This could be a statistical measure, such as variance or standard deviation, or an independently measured value, such as contrast or average modulation.

For minimizing T, a set of conditions can be established, including:

$$\frac{2 \partial T}{\partial f_k} = 0$$

where k ranges from 2 to K.

Considering individual data maps $m_k$ can be overlapped by q other maps, i.e., $m_{k1}$ to $m_{kq}$, then the above expression can be expanded into the following linear equation:

$$2 \cdot \delta_{k\_k1} \cdot tx_{k\_k1} + \ldots + 2 \cdot \delta_{k\_ki} \cdot tx_{k\_ki} + \ldots +$$
$$2 \cdot \delta_{k\_kq} \cdot tx_{k\_kq} + 2 \cdot q \cdot mx_k - 2 \cdot mx_{k1} - 2 \cdot q \cdot mx_{ki} - \ldots$$
$$2 \cdot mx_{kq} = 0$$

Balancing terms, the equation can be rewritten as:

$$\delta_{k\_k1} \cdot tx_{k\_k1} + \ldots + \delta_{k\_ki} \cdot tx_{k\_ki} + \ldots +$$
$$\delta_{k\_kq} \cdot tx_{k\_kq} = -q \cdot mx_k + mx_{k1} + \ldots +$$
$$mx_{ki} + \ldots + mx_{kq}$$

where $k_i$ varies from 1 to q, indicating the number i map overlapped with the number k map. The value of $\delta_{k\_ki}$ is either 1 or −1, depending on the order of overlap.

Adding the above-mentioned weight coefficient W, the linear equation can be rewritten as:

$$\sum_{ki=1}^{q} W_{k\_ki} \cdot \delta_{k\_ki} \cdot tx_{k\_ki} = -\left(\sum_{ki=1}^{q} W_{k\_ki}\right) \cdot mx_k + \sum_{ki=1}^{q} (W_{k\_ki} mx_{ki})$$

Since the values of $mx_1 \ldots mx_k$ are not independent, $mx_1$ is chosen as a known value, preferably zero for easy computation. The set of conditions:

$$\frac{\partial T}{\partial f_k} = 0$$

where (k=2, K) provide K−1 closed linear equations for K−1 unknowns and can be solved using a conventional linear system solver.

The weight coefficient $W_N$ can be based on a number of factors, as explained above, and can also be related to a threshold for such purposes of reducing the influence of noise. For example, if the overlapped size or other chosen factor is less than a particular value, the weight can be set to zero for disregarding unreliable data. Areas of overlap occupying at least 20 percent of the individual data maps are preferred.

Weighting can also be applied in other ways, influencing different stages of the calculations. For example, the accuracy of individual pixel values can be assessed by attendant measures of contrast, and the individual pixels that contribute to the parametric descriptions of the difference maps $d_1, d_2, \ldots d_N$ can be weighted according to their contrast. The values of higher contrast pixels are generally regarded as more accurate than the values of lower contrast pixels. At the edges of measurement, contrast drops to zero, indicative of the relative lack of information (e.g., interferometric information) expressed by the pixels.

Since the values of many more pixels are generally available than needed for parametrically defining the difference maps $d_1, d_2, \ldots d_N$, the parametric definitions can be based on a fewer number of higher contrast pixels or the pixels with higher contrast can be weighted progressively more than the pixels with lower contrast. The difference maps $d_1, d_2, \ldots d_N$ are based on the differences between overlapping pixels of the local data maps $m_1, m_2, \ldots m_K$, and each pixel pairing can be weighted according to the contrast of is lowest contrast pixel member.

Phase measuring interferometry (PMI) and other techniques for converting intensity data into measures of optical path length dependent variables, such as height or distance, vary measuring conditions through one or more cycles of constructive and destructive interference. For example, the test object 16 can be relatively tilted or translated through the one or more cycles of constructive and destructive interference, or the laser source 18 can be varied in frequency to accomplish a similar result. The interference cycle provides a context within which pixel intensity values can be converted into such measures as height or distance. The amplitude of the interference cycle, also referred to as the amplitude of pixel intensity modulation, is a measure of contrast that affects how accurately pixel intensity values can be converted into the measures of height or distance. The greater the amplitude of pixel intensity modulation over a given range of optical path length variation (typically one-half the wavelength for normal incidence interferometry), the more accurately the intensity values can be converted into the measures of height or distance.

Thus, each pixel intensity value together with its amplitude of modulation can be converted into a measure of surface height along with a measure of its relative accuracy. The pixel modulation amplitudes can be used as weighting factors for determining the relative contribution of individual pixel measurement values to collective assessments based on a set of the pixels. For fitting a difference surface (e.g., a plane) to the difference data maps $d_1, d_2, \ldots d_N$, the individual pixel difference pairings can be weighted unequally, based, for example, on the lower of the two modulation amplitudes of each pixel pairing.

Modulation amplitudes can also be used as one of the factors for the weight $W_N$ in the above calculations based, for example, on an overall averaging of the modulation amplitudes that contribute to each of the difference map $d_1, d_2, \ldots d_N$. Each pixel pairing relied on for parametrically defining the difference maps $d_1, d_2, \ldots d_N$, can be assigned one modulation amplitude according to the lower of its two modulation amplitudes, and the overall average of the assigned modulation amplitudes can be interpreted as a factor for weighting the difference map $d_1, d_2, \ldots d_N$.

After correcting for the parametrically defined values of piston $dp_1, dp_2, \ldots dp_N$ and tilt $dx_1, dx_2, \ldots dx_N$ and $dy_1, dy_2, \ldots dy_N$, the remaining differences within the regions of overlap can be more accurately resolved by weighting the overlapping pixels before choosing representative values. Within the regions of overlap, the pixels of two or more of the reoriented local data maps overlie each other, but only one value for each pixel location enters the composite global data map. For choosing the one value at each pixel location, the modulation amplitudes associated with the original pixel values can be used to differentially weight the overlapping pixels before averaging or otherwise choosing the one value for the composite global data map.

Amplitude modulation (i.e., contrast) can also be used as a weighting factor for pixels within conventional "stitching" routines for combining overlapping local data maps into a composite global data map. For example, one known iterative routine that converges toward minimal value difference maps weights the pixel pairing differences unevenly based on measures of statistical variation. More than one reading is taken for each pixel, and the variation among the readings is treated as a measure of reliability, with lower variation associated with higher reliability. A measure of contrast, such as amplitude modulation, could be used as an alternative pixel weighting in the conventional routines so that pixel pairings based on more accurate measures are weighted more heavily toward minimizing the difference maps. The measures of pixel contrast can be applied on a pixel-by-pixel basis or more broadly over an array of pixels as collective weights for assessing contributions from local or difference data maps.

Each parameter, including piston, X tilt, and Y tilt as well as any others defining the expected errors in the difference maps $d_1, d_2, \ldots d_N$ can provide a basis for directly calculating corresponding parameter values $mp_1, mp_2, \ldots mp_K, mx_1, mx_2, \ldots mx_K$, and $my_1, my_2, \ldots my_K$ for altering the relative orientations of the local data maps $m_1, m_2, \ldots m_K$. For example, curvature can be included among the parameters if the data maps $m_1, m_2, \ldots m_K$ are subject to such errors. Alternative parameter representations of the difference maps $d_1, d_2, \ldots d_N$ can also be made. For example, Zernike or other polynomial functions can also be fit to the difference maps to provide appropriate parametric descriptions.

Figure 4:
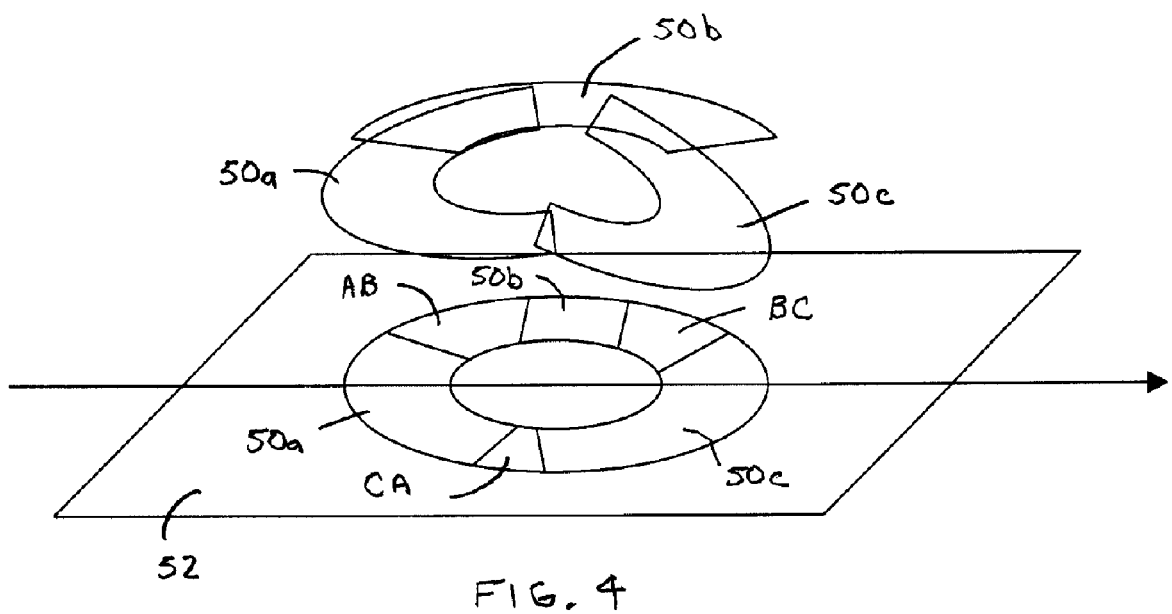
FIG. 4 is a perspective view showing the misorientation of local data maps projected above a reference plane as well as their intended overlap within the reference plane.

A schematic depiction of the stitching process is shown in FIG. 4. The relative image orientation of three local data maps 50a, 50b, and 50c is shown above a reference plane 52. After making the parametric adjustments to the orientations of the local data maps 50a, 50b, and 50c, the three local data maps 50a, 50b, and 50c all lie together on the same reference plane 52, which can be coincident with the original orientation of one of the local data maps, e.g., map 50a. Once oriented to the reference plane 52, data within the overlapping regions AB, BC, and CA on the reference plane 52 can be averaged together. Weighting can also be applied between the local data maps or to individual pixels within the local data maps to reduce the influence of noise. For example, data well within one local data map can be favored over overlapping pixels taken from an edge of another data map.

Figure 5:
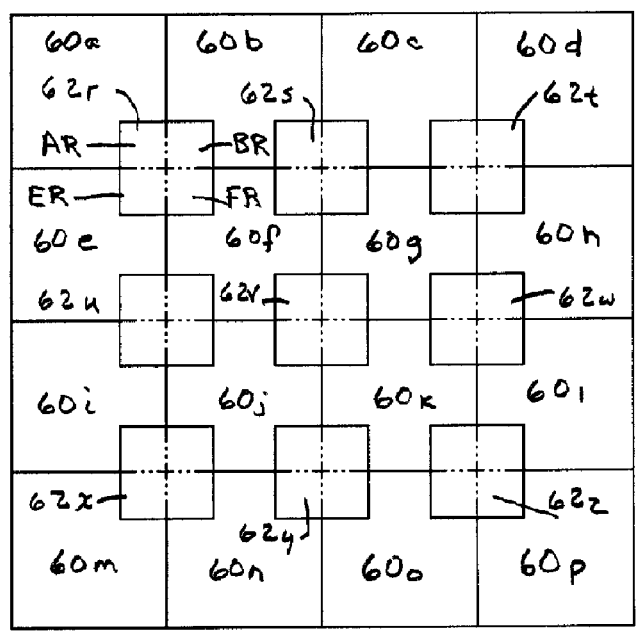
FIG. 5 is a plan view of an alternative pattern of local data maps captured by the imaging device at different locations across the test surface, including an underlying layer of substantially contiguous local data maps and an overlying layer with local data maps centered at the corner junctions of the underlying layer data maps.

The local data maps can be captured in patterns that reduce the need for applying weightings among the difference maps. For example, FIG. 5 shows a pattern of underlying data maps 60a through 60p arranged contiguously or minimally overlapping each other. An overlying pattern of data maps 62r through 62z locates the overlying data maps 62r through 62z in positions that overlap equal portions of the underlying data maps 60a through 60p. Thus, all of the areas of overlap are equally sized. For example, the size of the overlap areas AR, BR, ER, and FR are all equal.

Although the above-described data maps take a rectangular form, the data maps can be similarly collected and processed in a variety of different forms. For example, some digital imaging systems produce images (interpretable as local data maps) in a circular form. Other variations such as in the digital imaging system, the relative motion effector, the merit parameters, and the closed-form processing algorithms, can be made in accordance with the overall teaching of the invention.

What is claimed is:

1. A method of relating local topographical data maps of a test object with a digital image processing system for forming a composite global topographical data map corresponding to an assembly of the local topographical data maps of the test object, comprising steps of:

forming a plurality of local topographical data maps containing respective sets of values corresponding to surface height measurements of a test object taken by a digital imaging device of the digital image processing system over different portions of the test object;

evaluating overlapping regions of the local topographical data maps to define a plurality of difference maps containing values based on differences between the surface height measurements of the test object taken over common portions of the test object;

fitting a set of parameters to the difference maps to quantify initial differences between the overlapping regions of the local topographical data maps;

defining a corresponding set of parameters that can be varied in value for altering orientations of the local topographical data maps;

determining new values for the parameters of the local topographical data maps that satisfy a merit function incorporating the parameter values of the difference maps; and stitching the local topographical data maps together within the digital image processing system in accordance with the new parameter values of the local topographical data maps that satisfy the merit function producing a composite global topographical data map containing values corresponding to surface height measurements over a plurality of the local areas of the test object.

2. The method of claim 1 in which the set of parameters fit to the difference maps includes coefficients of a difference surface.

3. The method of claim 2 in which the set of parameter values that alter orientations of the local data maps includes surface coefficients corresponding to the surface coefficients of the difference surface.

4. The method of claim 3 in which the step of determining includes determining the surface coefficients of the local data maps required to compensate for the surface coefficients fit to the difference maps.

5. The method of claim 4 in which the surface coefficients of the local data maps are estimated from a closed set of linear equations.

6. The method of claim 5 in which in which differences between the surface coefficients of overlapping local data maps are collectively estimated by way of a linear regression matching the surface coefficients of the corresponding difference maps.

7. The method of claim 1 in which the parameters of the difference maps include piston and tilt terms of difference surfaces and the parameters of the local maps include piston and tilt terms of estimated orientation surfaces.

8. The method of claim 7 in which differences between the individual terms of overlapping local maps are matched to the individual terms of the corresponding difference maps, and any residual errors are collectively distributed among the matches.

9. The method of claim 8 in which the step of determining includes performing a least squares regression for minimizing the residual errors.

10. The method of claim 6 in which the matches are weighted for unevenly distributing the residual errors among the matches based on characteristics of the overlapping regions.

11. The method of claim 10 in which the matches are weighted according to sizes of the overlapping regions.

12. The method of claim 10 in which the matches are at least partially weighted by measures of optical contrast.

13. The method of claim 1 in which the step of forming the plurality of the local topographical data maps is based on interferometric images of different portions of a test object, wherein pixel intensity values of the interferometric images are evaluated as the surface height measurements within the local areas of the test object.

14. The method of claim 13 in which the local data maps are acquired in a pattern over the test object in which adjacent local data maps overlap each other.

15. The method of claim 14 in which the patterns are arranged so that the regions of overlap are similarly sized and shaped.

16. A method of stitching together overlapping measurements of a test object with a digital image processing system, comprising steps of:

acquiring overlapping images of different portions of the test object with a digital imaging device of the digital image processing system as a plurality of interference patterns;

converting pixel intensity values of the interference patterns into surface height measurements within the different portions of the test object to create a plurality of local topographical data maps;

describing differences between overlapping regions of the local topographical data maps as oriented difference surfaces;

establishing relationships among the local topographical data maps as oriented local surfaces;

determining descriptions of the oriented local surfaces based on collectively matching differences between the oriented local surfaces of overlapping local topographical data maps and the oriented difference surfaces of the corresponding overlapping regions; and combining the local topographical data maps of surface height measurements into a composite topographical data map of surface height measurements with the digital image processing system by modifying the local data maps based on the descriptions of the oriented local surfaces.

17. The method of claim 16 in which the step of describing differences between overlapping regions includes determining coefficients of the difference surfaces.

18. The method of claim 17 in which the step of establishing relationships includes defining terms of the local surfaces for describing relative orientations among the local data maps.

19. The method of claim 18 in which the step of determining descriptions includes determining coefficients of the local surfaces.

20. The method of claim 19 in which the step of combining the local data maps includes altering the local data maps according to the descriptions of corresponding local surfaces.

21. The method of claim 16 in which the step of determining descriptions includes solving linear equations in a closed form to collectively determine one or more descriptions of the oriented local surfaces.

22. The method of claim 21 in which differences between the oriented local surfaces of overlapping local data maps and the oriented difference surfaces are associated with residual errors that are collectively minimized according to a regression algorithm.

23. The method of claim 22 in which the residual errors are weighted to accommodate different overlapping regions.

24. The method of claim 23 in which the residual errors are weighted according to measures of optical contrast.

25. A method of stitching local topographical data maps of a test object together into a composite global topographical data map of the test object with a digital image processing system, comprising steps of:
    acquiring a plurality of overlapping topographical data maps of a test object using a digital imaging device of the digital image processing system, each of the overlapping topographical data maps containing a plurality of surface height measurements over different portions of the test object;
    describing differences in corresponding surface height measurements between overlapping local topographical data maps within regions of overlap as difference maps having parametric descriptions;
    deriving corrective orientations of the local topographical data maps by collectively matching parametric descriptions of the corrective orientations for the overlapping local topographical data maps to the parametric descriptions of the corresponding difference maps; and
    assembling the local topographical data maps in corrected orientations into a composite topographical data map of surface height measurements of the test object using the digital image processing system.

26. The method of claim 25 in which the parametric descriptions of the difference maps establish a merit function against which the parametric descriptions of the corrective orientations can be collectively assessed.

27. The method of claim 26 in which the step of deriving includes deriving the parametric descriptions of the corrective orientations using closed-form processing.

28. The method of claim 27 in which the merit function allows for the construction of a set of linear equations for solving for the parametric descriptions of the corrective orientations.

29. A method of combining local data maps into a composite global data map with a digital image processing system, comprising steps of:
    acquiring a plurality of local data maps corresponding to different portions of a desired field of view using a digital imaging device of the digital image processing system;
    weighting values based on the local data maps by measures of optical contrast; and
    assembling the local data maps having weighted values into a global composite data map with the digital image processing system for filling the desired field of view,
    wherein the local data maps are constructed from interference patterns within an interferometer of the digital image processing system, the interference patterns having individual pixels that are cycled between conditions of constructive and destructive interference as measures of the optical contrast.

30. The method of claim 29 in which the optical contrast is measured as an amplitude of pixel modulation through one or more cycles of the constructive and destructive interference.

31. A method of combining local data maps into a composite global data map with a digital image processing system, comprising steps of:
    acquiring a plurality of local data maps corresponding to different portions of a desired field of view with a digital imaging device of the digital image processing system;
    weighting values based on the local data maps by measures of optical contrast; and
    assembling the local data maps having weighted values into a global composite data map for filling the desired field of view using the digital image processing system,
    wherein the step of acquiring includes performing a phase-shifting operation that varies intensities of individual pixels through conditions of constructive and destructive interference as measures of optical contrast.

32. The method of claim 31 in which the phase-shifting operation includes a systematic variation in optical path length between interfering beam portions.

33. The method of claim 32 in which the phase-shifting operation includes a systematic variation in beam frequency.

* * * * *